United States Patent [19]
Knutsson et al.

[11] Patent Number: 6,085,108
[45] Date of Patent: *Jul. 4, 2000

[54] MODIFIED DOWNLINK POWER CONTROL DURING MACRODIVERSITY

[75] Inventors: Jens Knutsson, Djursholm; Magnus Persson, Sollentuna, both of Sweden

[73] Assignee: Telefonaktiebolaget LM Ericsson, Stockholm, Sweden

[ * ] Notice: This patent is subject to a terminal disclaimer.

[21] Appl. No.: 09/057,793

[22] Filed: Apr. 9, 1998

Related U.S. Application Data

[60] Provisional application No. 60/069,607, Dec. 15, 1997.

[51] Int. Cl.$^7$ ...................................................... H04B 1/00
[52] U.S. Cl. ............................................. 455/522; 455/69
[58] Field of Search ................................ 455/522, 67.1, 455/69, 70, 442; 370/328, 331, 332, 333, 335, 252

[56] References Cited

U.S. PATENT DOCUMENTS

| | | |
|---|---|---|
| 5,109,528 | 4/1992 | Uddenfeldt . |
| 5,327,577 | 7/1994 | Uddenfeldt . |
| 5,982,760 | 11/1999 | Chen ....................................... 455/522 |

FOREIGN PATENT DOCUMENTS

| | | |
|---|---|---|
| 0 577 322 | 1/1994 | European Pat. Off. . |
| 0 645 940 | 3/1995 | European Pat. Off. . |
| 0 680 160 | 11/1995 | European Pat. Off. . |
| 682 417 A2 | 11/1995 | European Pat. Off. . |
| 0 809 365 | 11/1997 | European Pat. Off. . |
| 92/21196 | 11/1992 | WIPO . |
| 95/08901 | 3/1995 | WIPO . |
| 95/12297 | 5/1995 | WIPO . |
| 97/08911 | 3/1997 | WIPO . |

*Primary Examiner*—Reinhard J. Eisenzopf
*Assistant Examiner*—Marsha D. Banks-Harold
*Attorney, Agent, or Firm*—Burns, Doane, Swecker & Mathis, L.L.P.

[57] ABSTRACT

The power levels of signals transmitted by base stations in a communication are controlled. Power level control commands are transmitted from a remote station to base stations from which the remote station receives signals to control the power levels of the signals transmitted by the base stations. A determination is made whether the remote station simultaneously receives a first signal from a first base station and at least one second signal from at least one second base station that include substantially identical message information. The first and second base stations transmit first and second reports of power levels of the first and second signals, respectively, to the controller. The controller compares the first and second reports and transmits first and second commands for adjusting the power levels of the first and second signals to the first and second base stations, respectively. The power level control commands are transmitted from the remote station to the base stations less frequently during macrodiversity to reduce the signalling requirements between the controller and the base stations. Also, the step size of the adjustment of the power levels of the first and second signals by the controller is reduced during macrodiversity to reduce the signalling requirements. This power control method is particularly beneficial for a CDMA system.

12 Claims, 5 Drawing Sheets

MODIFIED DOWNLINK POWER CONTROL DURING MACRODIVERSITY

This application claims the benefit of U.S. Provisional Application No. 60/069,607, filed Dec. 15, 1997.

BACKGROUND

This invention relates to the control of power levels of transmitted signals in telecommunication systems, in particular spread spectrum multiple access systems.

Good transmit power control methods can be important to communication systems having many simultaneous transmitters because such methods reduce the mutual interference of such transmitters. For example, transmit power control is necessary to obtain high system capacity in communication systems that use code division multiple access (CDMA). This is important for the uplink, i.e., for transmissions from a remote terminal to the network, e.g., a base station. Uplinks are also sometimes called reverse links.

The need for transmit power control in the uplink is recognized in current CDMA cellular systems. Uplink power control according to the IS-95-A standard is provided by a closed-loop method, in which a base station measures the strength of a signal received from a remote station and then transmits one power control bit to the remote station every 1.25 milliseconds. Based on the power control bit, the remote station increases or decreases its transmit (uplink) power by a predetermined amount.

The need for transmit power control for the downlink, i.e., for transmission from the network to a remote station, has been deemed less important in current cellular and other CDMA communication systems.

A trivial form of downlink power control would be provided by a communication system in which a remote terminal measures its received downlink power level and simply reports the measurement to a base station, which might adjust its transmit power in predetermined circumstances. Such a communication system is among those described in International Patent Publication No. WO 95/12297 by Gilhousen et al., which also describes a communication system in which downlink transmit power level is reduced by a predetermined amount based on frame error rate measurements, received uplink power levels, or received downlink power levels.

Downlink power control in a system compliant with the IS-95-A standard is based on frame error rate (FER) measurements by the remote station, which sends FER reports to the system. Sections 6.6.4.1.1 and 7.6.4.1.1 of the IS-95-A standard note that such FER reports can be sent when a threshold has been crossed and/or periodically. (Typically, an FER report would be sent every 1–5 seconds.) One problem with this method is that it can take a long time (several seconds) to accumulate the appropriate FER statistics. As a result, it is impossible to track Rayleigh fading and shadow fading. The method has proved to be so slow that it is usually attributed hardly any gain compared to not using downlink power control.

Some newer personal communications systems (PCS) also use CDMA. The features of U.S. PCS systems are specified in "Personal Station-Base Station Compatibility Requirements for 1.8 to 2.0 GHz Code Division Multiple Access (CDMA) Personal Communications Systems", ANSI J-STD-008 (August 1995), which is similar to the cellular IS-95 standard in many respects. For operation with rate set 2, however, the J-STD-008 standard requires the remote station to report downlink frame errors whenever they occur. This puts the network in complete control of frame errors, but it still takes a long time to accumulate the appropriate statistics, yielding only slight improvement over the IS-95-A standard's method.

In other communication system concepts like CODIT, which is described in "Final Report on Radio Subsystem Functionality", R2020/CSE/LC/DS/P/047/a1, UMTS Code Division Testbed (CODIT), CSELT Centro Studi e Laboratori Telecomunicazioni S.p.A. ed. (August 1995), the signal quality is determined by estimating the raw bit error rate (BER) instead of the FER. Hence, good statistics can be obtained faster, and a remote station sends BER reports to the network more often (typically, 1–10 times per second). System performance is considerably improved in comparison to a system using downlink transmit power control according to the IS-95-A standard, but the CODIT method is still too slow to handle Rayleigh fading.

One might use the uplink transmit power control method described in the IS-95-A standard for transmit power control in the downlink. This is described in European Patent Publication No. 0 680 160 by Dohi et al. The remote terminal would then measure the downlink signal to interference ratio (SIR) and transmit an appropriate power control command on the uplink. In accordance with the IS-95-A standard, each power control command would be a single bit that was uncoded in order to minimize signalling overhead. Nevertheless, the communication system to which European No. 0 680 160 is directed has some significant differences from the system specified by the IS-95-A standard. For example, the European system has a frame length that is half that of IS-95-A, a bit rate of several hundred kilobits per second, a wider channel bandwidth of 5 MHZ, and a CDMA chip rate of four million chips per second.

Such a communication system would track Rayleigh fading fairly well, and might work well when the remote terminal is not in a soft handoff mode, i.e., when the remote terminal is not communicating with two or more base stations simultaneously. This is sometimes also referred to as macrodiversity. Soft handoff is described in U.S. Pat. No. 5,109,528 to Uddenfeldt and U.S. Pat. No. 5,327,577 to Uddenfeldt, both of which are expressly incorporated here by reference. When the remote terminal is not in soft handoff mode, the error rate of the uncoded power control commands would typically be about one percent, which would not cause any great problems.

Nevertheless, the error rate of the uncoded downlink power control commands can be expected to increase significantly when the remote terminal is in soft handoff mode. In addition, the errors in the commands received in different base stations involved in the soft handoff will be almost independent. Since 1600 power control commands per second would be sent to two base stations involved in a soft handoff according to the system described by Dohi et al., the commanded transmit power levels of the base stations can be expected to drift with respect to each other to levels that may be suboptimal from a system-capacity point of view. The lost capacity occurs because at least one of the base stations in communication with a remote station in soft handoff mode will transmit at a power level that is too high.

One way to solve the problems encountered in downlink transmit power control is by making frequent adjustments of the downlink power levels transmitted from the base stations involved in a soft handoff. These base stations send the latest values of their downlink transmit power levels to a radio network controller (RNC) which those values and sends respective adjustment commands $\Delta P_1^{DL}(t_n)$ and $\Delta P_2^{DL}(t_n)$ back to the base stations. This solution is disclosed in U.S. patent application No. 08/870,867, filed Jun. 6, 1996, and herein incorporated by reference.

Figure 1:
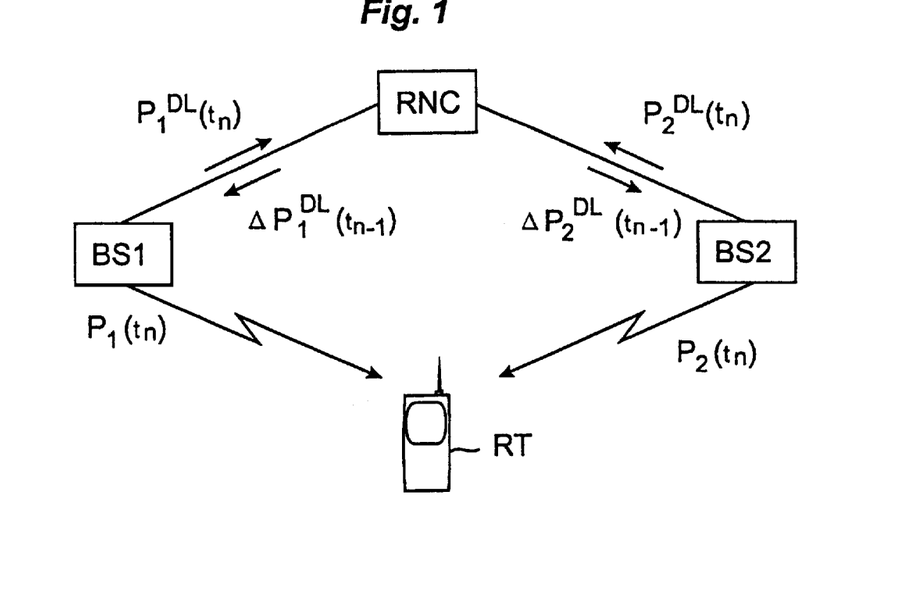
FIG. 1 illustrates a method of downlink transmit power control during soft handover.

This method is illustrated in FIG. 1, in which a base station BS1 sends a message $P_1^{DL}(t_n)$, indicating its downlink transmit power level $P_1(t_n)$ at time $t_n$, to a radio network controller (RNC). In a cellular communication system, the RNC might be a base station controller or a mobile services switching center. Also, a base station BS2 sends a message $P_2^{DL}(t_n)$, indicating its downlink transmit power level $P_2(t_n)$ at time $t_n$, to the RNC. In the soft handoff mode shown in FIG. 1, a remote station RT receives signals from the base station BS1 and receives signals having substantially the same message information from the base station BS2.

The RNC sends respective adjustment commands $\Delta P_1^{DL}(t_n)$ and $\Delta P_2^{DL}(t_n)$ to the base stations that are based on the messages $P_1^{DL}(t_n)$, $P_2^{DL}(t_n)$, causing the base stations to adjust their downlink transmit power levels so that a desired relation between $P_1(t_{n+1})$ and $P_2(t_{n+1})$ is maintained. The transmit power levels $P_1(t_n)$, $P_2(t_n)$ result from earlier commands $\Delta P_1^{DL}(t_{n-1})$ and $P_2^{DL}(t_{n-1})$, as shown in FIG. 1.

The RNC can determine the adjustment commands in several ways, as described in U.S. patent application Ser. No. 08/870,867. The power level adjustments typically are made once per frame, keeping the drift between the downlink transmit power levels of the downlink transmitters involved in a soft handoff to a low level, e.g., less than 1 dB on average.

Figure 2:
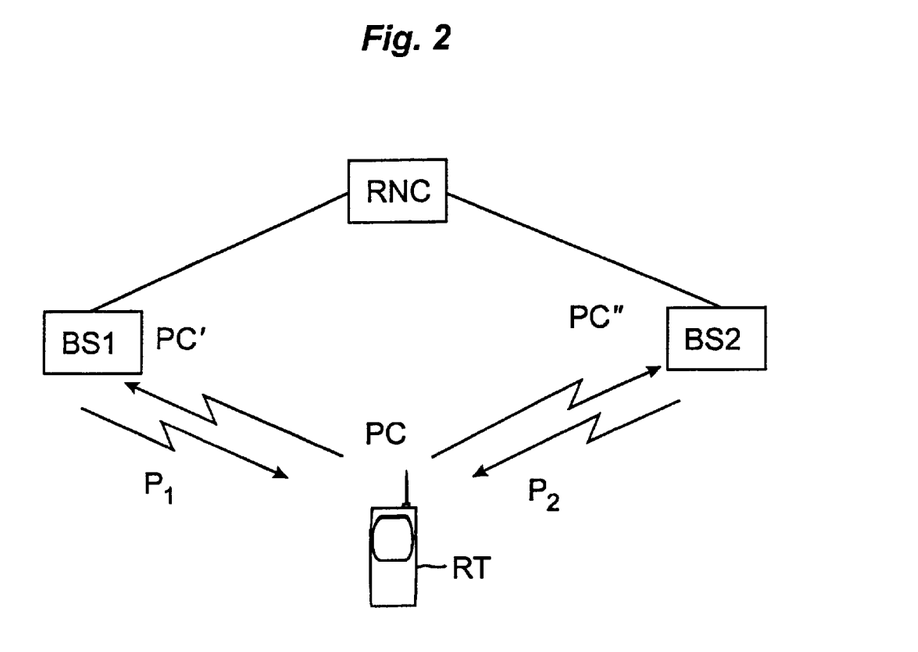
FIG. 2 illustrates a soft handoff involving a remote station and two base stations.

How the independent errors in a remote station's power control commands come about is illustrated in more detail in FIG. 2, which shows a remote terminal RT in communication with two base stations BS1, BS2 that are under the control of an RNC. In the soft handoff mode shown in FIG. 2, as in FIG. 1, the remote station RT receives signals from the base station BS1 with a power level $P_1$ and receives signals having substantially the same message information from the base station BS2 with a power level $P_2$. Power control commands PC transmitted by the remote station RT are received by the base station BS1 as commands PC' and are received by the base station BS2 as commands PC". Due to errors that may arise from many sources, a command may not be the same as either or both of the commands PC', PC", and the command PC' may not be the same as the command PC".

The magnitude of the difference between one downlink power level and another downlink power level affects the system's capacity because one base station's transmissions look like interference to the other base station. In addition, the rate that each downlink power level drifts is important because faster rates usually require the control commands to be issued more frequently. This increases the messaging load that must be carried by the links between the base stations BS1, BS2 and the RNC.

According to U.S. patent application Ser. No. 08/870,867, these problems are avoided by using quality-based downlink power control. According to this approach, the remote terminal RT measures the quality of the received downlink signal, either by determining the FER or the BER, and then the remote terminal RT reports its quality measurement to the network by sending a suitable quality message to the base stations involved in the handoff. Each base station forwards the remote terminal's quality message (a Layer-3 message) to the RNC, which causes the base stations to adjust their downlink transmit powers appropriately.

According to U.S. patent application Ser. No. 08/870,867, the remote station RT either may periodically send reports of its received downlink signal strength to the network or may send a report whenever a signal from a new downlink transmitter is received with a strength that is higher than any other currently received downlink signal strength. In such a communication system, the network RNC would respond to the remote station's signal strength reports by causing only the base station whose downlink signal is received with the highest strength at the remote terminal RT to transmit.

Figure 3:
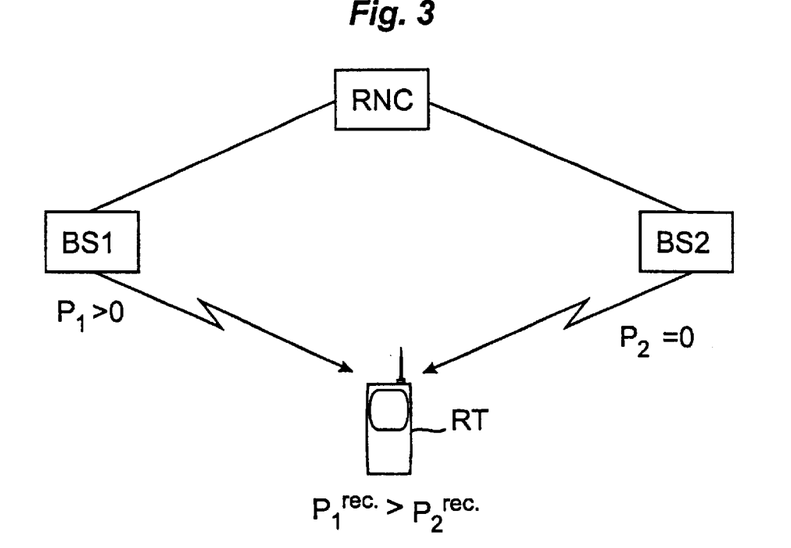
FIG. 3 illustrates one method of overcoming a problem of a remote station's power control commands being received with a signal level that is too low during soft handoff mode.

This scenario is depicted in FIG. 3, which shows that when the remote terminal's received downlink power level $P_1$ from the base station BS1 is greater than the received downlink power level $P_2$ from the base station BS2, the downlink power level $P_1$ transmitted by the base station BS1 is greater than zero, and the downlink power level $P_2$ transmitted by the base station BS2 is zero. (In practice, the power level $P_2$ only needs to be substantially less than the power level $P_1$.) The weaker base station BS2 should operate otherwise normally in soft handoff mode. The network informs the remote terminal RT whenever the system decides to change the transmitting base station to accommodate base station differences, such as different pseudonoise signals, although different base stations generally look the same from the point of view of the remote station in soft handoff mode.

Yet another solution disclosed in U.S. patent application Ser. No. 08/870,867 is to apply open loop power control instead of closed loop power control during the macrodiversity connection. According to this approach, the uplink SIR is measured for each frame in the base stations involved in a soft handoff, and the SIR measurements are forwarded to the RNC. The RNC processes the SIR values from the base stations involved in the soft handoff and causes only that base station to transmit whose downlink power level received at the remote terminal is highest.

Figure 4:
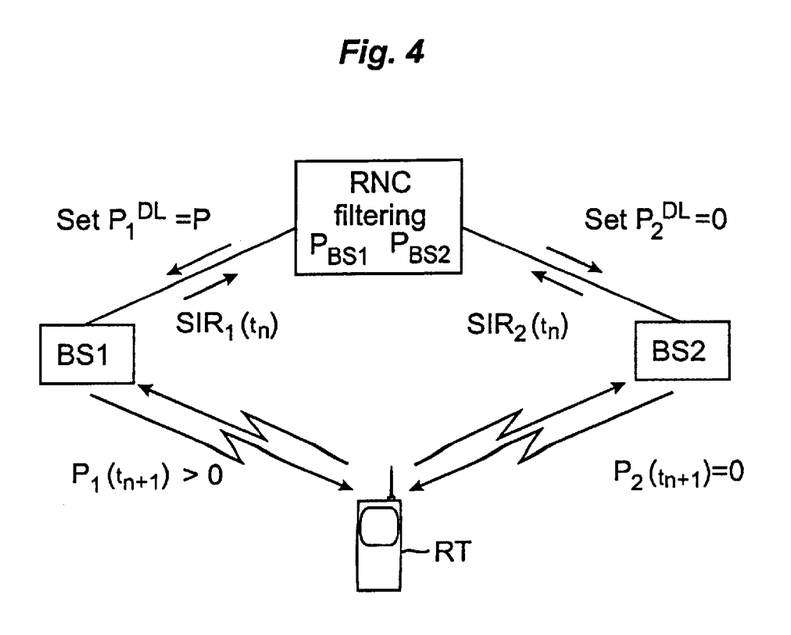
FIG. 4 illustrates another method of overcoming the problem of a remote station's power control commands being received with a signal level that is too low during soft handoff mode.

This scenario is depicted in FIG. 4, which shows that the downlink power level $P_1(t_{n+1})$ transmitted by the base station BS1 at a time $t_{n+1}$ is greater than zero, and the downlink power level $P_2(t_{n+1})$ transmitted by the base station BS2 at the time $t_{n+1}$ is zero. This condition occurs as a result of respective downlink transmit power control set commands $SetP_1^{DL}$, $SetP_2^{DL}$ sent by the RNC to the base stations BS1, BS2, respectively. The RNC generates the power set commands based on the base stations' respective determinations and reports of the uplink SIR values $SIR_1(t_n)$, $SIR_2(t_n)$ at the preceding time $t_n$.

Hence, on occasions when the uplink power received at a base station, e.g., station BS1, is higher than the uplink power received at another base station, e.g., station BS2, the RNC sends messages to the base station BS1 causing the station BS1 to start transmitting to the remote terminal RT, to the base station BS2 causing the station BS2 to stop transmitting to the remote terminal RT, and to the remote terminal RT causing the terminal RT to listen only to base station BS1 and not to base station BS2 from a specific frame number onwards.

Figure 5A:
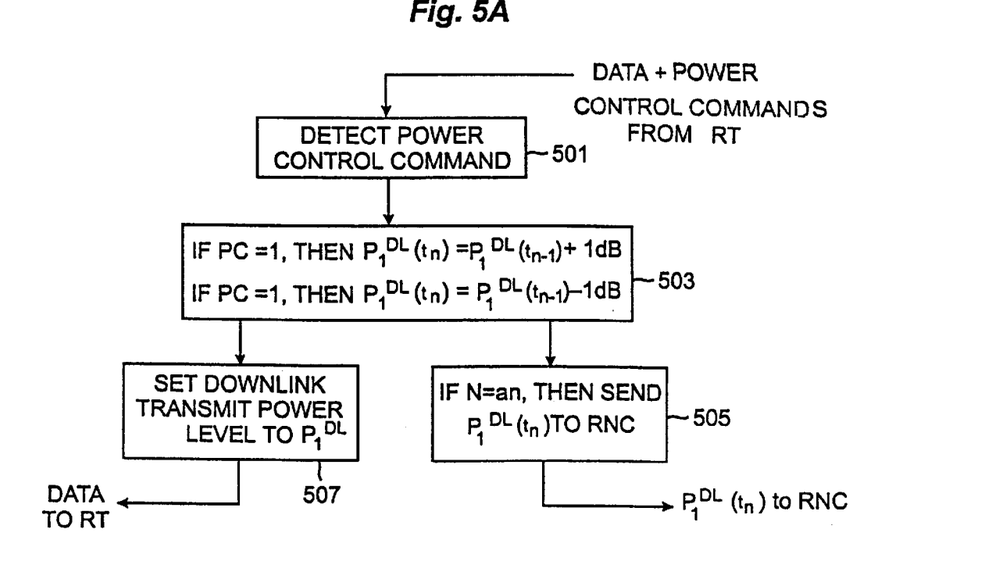
FIG. 5A and FIG. 5B illustrate communication system operation.
Figure 5B:
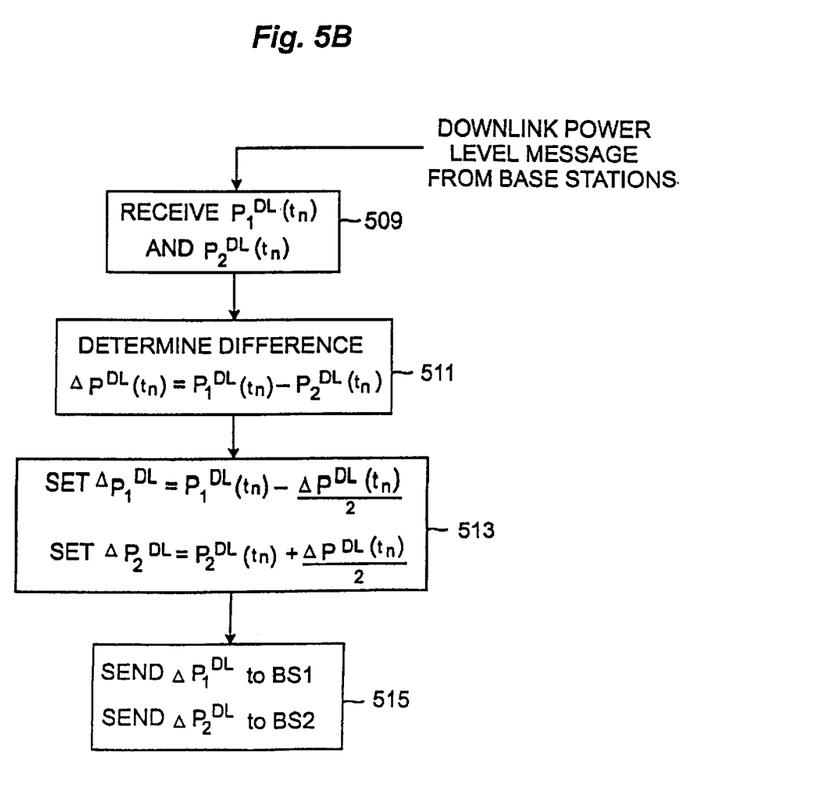
Figure 5C:
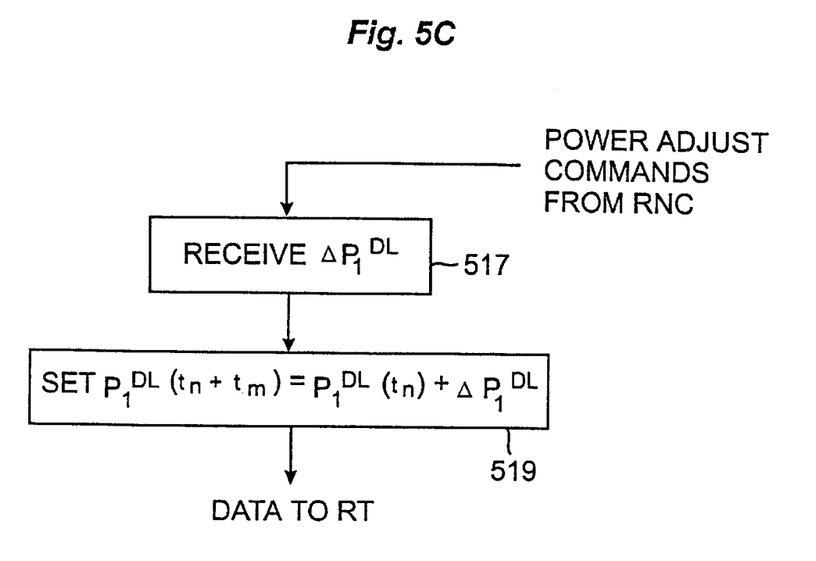

FIGS. 5A, 5B, and 5C further illustrate operation of a communication system in accordance with U.S. patent application Ser. No. 08/870,867. In block 501, base station BS1 receives data and transmit power adjustment commands from a mobile station RT. The base station BS1 identifies and decodes an adjustment command received at a first time instant, which conveniently may have values of either+1 or−1, and accordingly adjusts its downlink transmit power level at the next time instant. As indicated by block 503 in FIG. 5A, for example, if the mobile sends adjustment command PC=1, then the base station's transmit power level $P_1(t_{n+1})=+1$ dB with respect to its previous transmit power level $P_1(t_n)$. Similarly, if the mobile sends adjustment command PC=−1, then the base station's transmit power level $P_1(t_{n+1})=-1$ dB with respect to its previous transmit power level $P_1(t_n)$. In block 505, the message $P_1^{DL}(t_n)$ indicating the downlink transmit power level $P_1(t_n)$ at time $t_n$ is sent by the base station BS1 to the RNC. The base station preferably sends such messages not as often as the mobile sends power adjustment commands in order to reduce the signalling load on the base station—controller connection. For example, the base station may count the number of received adjustment commands n and send a message every N-th adjustment command, where N is a factor a times the number n. The factor a may be an integer in the range from about 16 to about 1600 for some communication systems. In block 507, the base station BS1 sets its downlink transmit power level to the commanded amount.

As indicated by block 509 in FIG. 5B, the RNC receives the messages $P_1^{DL}(t_n)$ and possibly messages from other base stations involved in a soft handoff, e.g., $P_2^{DL}(t_n)$. The RNC, which may include specialized circuitry or a programmable processor for the purpose, then determines new respective adjustment commands $\Delta P_1^{DL}(t_n)$ and $\Delta P_2^{DL}(t_{n+1})$, which as indicated by block 513 in FIG. 5B may be based on the difference (block 511) between the downlink transmit power levels $P_1(t_n)$, $P_2(t_n)$ of the base stations BS1, BS2. In the example illustrated, $P_1^{DL}(t_n)>P_2^{DL}(t_n)$, and thus the new adjustment command $\Delta P_1^{DL}(t_{n+1})$ corresponds to the first base station's previous power level less half of the difference between the power levels, and the new adjustment command $\Delta P_2^{DL}(t_{n+1})$ corresponds to the second base station's previous power level plus half of the same difference. If $P_2^{DL}(t_n)>P_1^{DL}(t_n)$, substantially the same operation would be carried out, but the identities of the base stations would be interchanged. These commands are then communicated in any convenient way to the respective base stations as indicated by block 515.

The operation of this kind of communication system is further illustrated by FIG. 5C, in which an adjustment command $\Delta P_1^{DL}$ from the RNC is received by the base station BS1 as indicated by block 517. In response, the base station adjusts its transmit power level at a time $t_n+t_m$ as indicated by block 519, where the interval $t_m$ is a convenient time interval, such as an integer number of communication frames. Similar operation are carried out in the other base station (station BS2). In addition, if the power level of the weaker base station was commanded to be substantially zero by the operations indicated by blocks 511–519, the weaker base station might advantageously be maintained in soft handoff mode in all other respects as described above.

The closed loop downlink power control method described above with reference to FIG. 1 involves extra signalling between the base stations and the RNC. For example, the base stations need to send a power message to the RNC about every 10 msec in order to keep drift at around 1–2 dB in a system with a high rate uncoded or little coded power control commands and a power adjustment step size of 1 dB. While the other solutions disclosed with reference to FIGS. 3 and 4 result in a fairly low amount of control signalling between the RNC and the base stations, there remains a need for efficient closed loop power control combined with a method of sending power control data from an RNC to associated base stations during macrodiversity transmissions.

SUMMARY

It is therefore an object of the present invention to provide an efficient closed loop power control of the base stations that are involved in a macrodiversity transmission to a particular mobile station. It is a further object of the present invention to reduce signalling requirements between base stations involved in a macrodiversity transmission and a controller adjusting the power levels of the base stations.

According to the invention, these and other objects are met by a method of controlling power levels of signals transmitted by base stations in a communication system having base stations and remote stations. Power level control commands are transmitted from a remote station to the base stations from which the remote station receives signals, to control the power levels of the signals transmitted by the base stations. A determination is whether the remote station is simultaneously receiving a first signal transmitted by the first base station and at least one second signal transmitted by at least one second base station that include substantially identical message information. A first report of a power level of the first signal is transmitted to a controller from the first base station. At least one second report of a power level of at least one second signal is transmitted to the controller from at least one second base station. The first report and at least one second report are compared in the controller. A first command for adjusting the power level of the first signal is transmitted from the controller to the first base station, and at least one second command for adjusting the power level of the at least one second signal is transmitted from the controller to at least one second base station.

According to a first embodiment of the invention, the power level control commands are transmitted from the remote station to the base stations at a reduced rate when the remote station receives signals from more than one base station. According to a first aspect, the same power level control commands are transmitted several times from the remote station to the base stations. According to a second aspect, more redundancy is encoded into the power level control commands transmitted from the remote station to the base stations. According to a third aspect, power control commands which are specific to one or more base stations are transmitted to those base stations.

According to a second embodiment of the invention, a step size of the adjustment of the power levels by the controller is set lower when the remote station receives signals from more than one base station than when the remote station receives signals from one base station.

The invention will now be described in more detail with reference to preferred exemplifying embodiments and the accompanying drawings.

DETAILED DESCRIPTION

It should be understood that the following description, while indicating preferred embodiments of the invention, is given by way of illustration only, since various changes and modifications within the scope of the invention will become apparent to those skilled in the art.

Using an RNC or some other entity in a communication network for adjusting the base station output power levels, as disclosed for example in U.S. patent application Ser. No. 08/807,867, is an efficient method for keeping the traffic channel output powers at proper levels during macrodiversity. However, this results in extra signalling between the RNC and the base stations. According to the present invention, several methods can be employed to reduce the signalling between the RNC and the base stations.

For example, the needed power control command rate, i.e., the rate of power control commands transmitted by the mobile station to the base stations that is needed in order to reach the SIR target, may be lowered during soft handover, e.g., by a factor of 4. The idea behind this approach is that the drift will be smaller if fewer messages are sent to the base stations, because fewer messages will be interpreted differently by the base stations. This is feasible, since the purpose of fast closed loop power control is to follow fast fading. In soft handover, fast fading will not be as severe as it is under normal conditions due to good space diversity.

Another way to lower the signalling requirements between the RNC and the base stations is to lower the power adjustment step size, i.e., the relative amount that the output power is adjusted responsive to the RNC power adjustment commands. According to an exemplary embodiment, a step size of 1 dB may be lowered to 0.25 dB during macrodiversity. The idea of lowering the step size is to make the drift slower, since each time a power control message is received differently it will only result in a small drift. This means that the RNC does not have to adjust the base stations' output power levels as often as it would have had to for larger step sizes, if an equally large drift is allowed before adjustments are needed. A benefit of this approach is that it requires little or no signalling over the air interface.

To further decrease the required signalling between the RNC and the base stations, the same power control command may be transmitted from the mobile station to the base stations several times. Hence, the probability that the power control command is received correctly increases, since the probability that the majority of the received bits are correctly received increases as the number of bits considered increases. For example, it is less likely that four or more bits in an 8 bit power control command will be received incorrectly than that one or more bits of a 2 bit long command will be received incorrectly.

Yet another alternative for reducing signalling requirements between the base stations and the RNC is to use more coding on the power control commands transmitted from the mobile station to the base station, i.e., to increase the encoding redundancy of power commands during macrodiversity.

In both of these approaches, extra bits are used in the power control commands transmitted from the mobile station to increase the probability that the power control commands are correctly received by the base stations during macrodiversity.

A lower power control command rate also makes it possible to send different power control commands to different base stations. Thus, the output powers from different base stations can be made gain dependent by adding little or no extra signalling. This approach has the additional benefit of reducing unwanted power drift because the mobile station is able to counteract the power drift by choosing the power control commands sent to different base stations in such a way that the power drift is reduced. However, in order to send the appropriate power control commands to different base stations, the mobile station needs to know the output power levels at the different base stations. Accordingly, the base stations send information regarding their output power levels to the mobile station. The mobile station is not likely to counteract the power drift if it transmits the same power command to all base stations to which it is currently connected.

The approaches described above can, of course, be combined. Also, by introducing extra signalling, other output power schemes can be supported.

Figure 6:
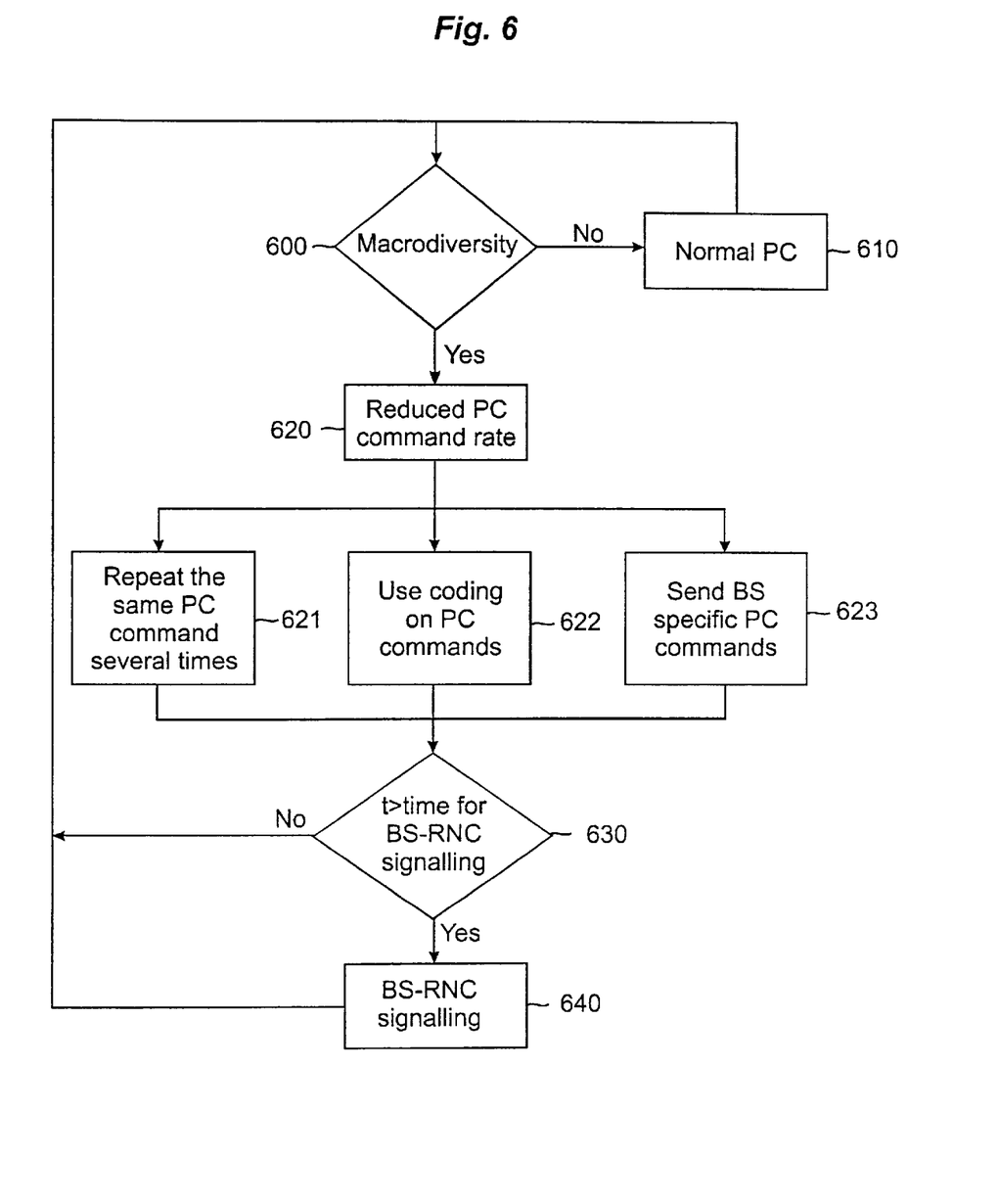
FIG. 6 shows a flow diagram of a method according to an exemplary embodiment of the invention.

A method for reducing signalling requirements between the base stations and the RNC, according to the present invention, is illustrated as a flow diagram in FIG. 6. The method begins at step 600, at which a determination is made whether macrodiversity transmission is occurring. If so, the method continues with step 620. Otherwise, power control commands are sent to the active base station from the mobile station at a normal rate at step 610, and the method returns to step 600.

At step 620, power control commands are sent from the mobile station to the base stations involved in the macrodiversity transmission at a reduced rate. Step 620 may include one or more steps 621, 622, and 623 which may be carried out in parallel.

At step 621, power control commands are sent from the mobile station to the base stations involved in the macrodiversity transmission at a reduced rate by repeating at least some of the power control commands. Multiple consecutive and identical power control commands increase the probability that the commands are received correctly. This reduces the amount of signalling required between the base stations and the RNC.

At step 622, power control commands are sent from the mobile station to the base stations involved in the macrodiversity transmission at a reduced rate by encoding more redundancy into the commands. The higher rate of coding increases the probability that the power control commands are received correctly. This reduces the amount of signalling requirements between the base stations and the RNC.

At step 623, power control commands are sent from the mobile station to the base stations involved in the macrodiversity transmission at a reduced rate by transmission of specific power control commands to each base station involved in the macrodiversity transmission. Thus, the signalling between the base stations and the RNCs is reduced, and the system is made more flexible.

At step 630, a determination is made whether a time counter parameter t exceeds a predetermined threshold. The parameter t represents the time since the last power level adjustment signalling between the RNC and the base stations. The threshold indicates how often the power level adjustment signalling between the base stations and the RNC is needed. If the time counter parameter t is not greater than the threshold, the method returns to step 600. Otherwise, the time counter parameter t indicates that it is time to adjust the downlink output power level at the base stations involved in the macrodiversity transmission. Therefore, at step 640, measured power level reports are forwarded from the base stations to the RNC, and new downlink output power levels are sent from the RNC to the base stations. Then, the method returns to step 600.

An alternative for reducing the power control signalling between the RNC and the base stations, not shown in FIG. 6, is to lower the step size in output power level adjustments by the RNC.

This method of modifying power control may be implemented in any system employing macrodiversity. This method is especially advantageous for systems using a downlink power control and which update the base stations' output power levels often.

The following description explains how the signalling may be implemented for various illustrative scenarios, but one skilled in the art will appreciate that signalling may be performed in other ways. The following description only considers the cases in which the mobile station is entering macrodiversity with one new base station, and the mobile station is not initially involved in a macrodiversity transmission. Other scenarios are easy to imagine, for instance cases in which the mobile station is connected to more than two base stations, cases in which the mobile station leaves macrodiversity with one or several base stations and at the same time enters macrodiversity with one or several base stations, or cases in which the base stations are connected to different RNCs.

In a first scenario, the decision for what kind of power control scheme to use is made in the mobile station. When a new macrodiversity base station is connected, and the closed loop power control is up and running, the mobile station indicates that it wants to modify the power control command rate by sending a message to the base stations. The message contains information about the mobile station as well as information about how the power control command rate should be altered. When a base station which is an intended recipient of the message receives the message, that base station responds with a positive acknowledgment signal (ACK). In order to avoid only one base station receiving the message, some signalling in the fixed network is required, e.g., to verify that all involved base stations are aware and prepared for the suggested modification and to make the RNC aware and let it prepare for the modification.

As soon as the mobile station receives at least one ACK from the base stations, it sends a message indicating that it is starting to use the new power control scheme. The mobile station then prepares itself for the new power control scheme and starts following it.

When a base station receives the message that indicates that the mobile station has started using the new power control scheme, it informs the other involved base stations as well as the RNC. At the same time, the base stations start following the new power control scheme.

In order to use coded power control commands, including repetition, the base stations have to buffer the received power control commands before they adjust their output powers. If the mobile station sends different messages to different base stations, this can be achieved either by putting an address in each power control command message or, more preferably, by letting the base stations know which power control commands they should listen to. This may be achieved by using a pattern for the power control commands. For example, every other slot of a power control command may be dedicated to a particular base station. However, assuming that the base stations do not notice that the mobile station is changing the power control command rate or that the ACK is lost, then the mobile station has to re-transmit the lost message.

It is, of course, possible to change the power control scheme during macrodiversity. The mobile station may go back to the ordinary power control scheme just before the macrodiversity transmission ends. Since both the network and the mobile know when this happens, little or no additional signalling is required.

In another scenario, the determination to alter the power control scheme is made in the network, e.g., in the RNC. In this scenario, as soon as a mobile station enters macrodiversity with a new base station, and the closed loop is up and running, the RNC informs the involved base stations about the power control scheme needed. This message is also transmitted to the mobile station. Both the base stations and the mobile station prepare themselves for the new scheme, and the mobile station sends a message indicating that it has started using the new power control scheme to the base stations. The base stations respond with an ACK. Since the base stations communicate with each other by using the fixed network, the mobile station only needs to receive one ACK. If no ACK is received within a certain time, the mobile station sends a new start message.

For the case when the step size is altered, the mobile station does not have to be involved in any signalling unless the mobile station decides which step size to use, since the network knows when macrodiversity begins, and the RNC can simply order the involved base stations to alter their step sizes.

The ordinary power control scheme should be restored when the mobile station leaves macrodiversity. This may be achieved without adding much signalling over the air interface.

According the present invention, signalling between the base stations and the RNC for adjusting the base stations' output power during macrodiversity transmission is significantly reduced. Closed loop power control may be supported during an entire session with reduced signalling between the base stations and the RNC. In addition, the accuracy with which power control commands are received by the base stations from the mobile station is increased. Further, the mobile station may send different commands to different base stations, providing a flexible telecommunications system and avoiding power drift.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling power levels of signals transmitted by base stations in a communication system having base stations and remote stations, comprising the steps of:

transmitting power level control commands from a remote station to the base stations from which the remote station is receiving signals, to control the power levels of the signals transmitted by the base stations;

determining whether the remote station is simultaneously receiving a first signal transmitted by a first base station and at least one second signal transmitted by at least one second base station that include substantially identical message information;

transmitting to a controller from the first base station a first report of a power level of the first signal;

transmitting to the controller from the at least one second base station at least one second report of a power level of the at least one second signal;

comparing in the controller the first report and the at least one second report;

transmitting from the controller to the first base station a first command for adjusting the power level of the first signal; and transmitting from the controller to the at least one second base station at least one second command for adjusting the power level of the at least one second signal, wherein the power level control commands are transmitted less frequently from the remote station to the base stations when the remote station receives signals from more than one base station than when the remote station receives signals from only one base station.

2. The method of claim 1, wherein the same power level control commands are transmitted several times from the remote station to the base stations when the remote station receives signals from more than one base station.

3. The method of claim 1, wherein more redundancy is encoded into the power level control commands transmitted from the remote station when the remote station receives signals from more than one base station than when the remote station receives signals from one base station.

4. The method of claim 1, wherein the power level control commands transmitted from the remote station are specific to the base stations to which they are transmitted.

5. The method of claim 1, wherein a step size of the power level adjustment by the controller is set lower when the remote station receives signals from more than one base station than when the remote station receives signals from one base station.

6. The method of claim 1, wherein the communication system is a Code Division Multiple Access (CDMA) system.

7. A method of controlling power levels of signals transmitted by base stations in a communication system having base stations and remote stations, comprising the steps of:

transmitting power level control commands from the remote station to the base stations from which the remote station is receiving signals, to control the power levels of the signals transmitted by the base stations;

determining whether the remote station is simultaneously receiving a first signal transmitted by a first base station and at least one second signal transmitted by at least one second base station that include substantially identical message information;

transmitting to a controller from the first base station a first report of a power level of the first signal;

transmitting to the controller from the at least one second base station at least one second report of a power level of the at least one second signal;

comparing in the controller the first report and the at least one second report;

transmitting from the controller to the first base station a first command for adjusting the power level of the first signal; and transmitting from the controller to the at least one second base station at least one second command for adjusting the power level of the at least one second signal, wherein a step size of the power level adjustment by the controller is set lower when the remote station receives signals from more than one base station than when the remote station receives signals from only one base station.

8. The method of claim 7, wherein the power level control commands are transmitted less frequently from the remote station to the base stations when the remote station receives signals from more than one base station than when the remote station receives signals from only one base station.

9. The method of claim 8, wherein the same power level control commands are transmitted several times from the remote station to the base stations, when the remote station receives signals from more than one base station.

10. The method of claim 8, wherein more redundancy is encoded into the power level control commands transmitted from the remote station when the remote station receives signals from more than one base station than when the remote station receives signals from one base station.

11. The method of claim 8, wherein the power level control commands transmitted from the remote station are specific to the base stations to which they are transmitted.

12. The method of claim 7, wherein the communication system is a Code Division Multiple Access (CDMA) system.

* * * * *